US011627182B2

(12) United States Patent
Chen et al.

(10) Patent No.: US 11,627,182 B2
(45) Date of Patent: Apr. 11, 2023

(54) SHARE BASED AUGMENTED REALITY CONTENT SERVICE SYSTEM

(71) Applicant: Lemon Inc., Grand Cayman (KY)

(72) Inventors: Yiling Chen, Los Angeles, CA (US); Jie Liao, Los Angeles, CA (US); Feng Cai, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 72 days.

(21) Appl. No.: 17/394,390

(22) Filed: Aug. 4, 2021

(65) Prior Publication Data
US 2023/0042835 A1 Feb. 9, 2023

(51) Int. Cl.
*H04L 67/1012* (2022.01)
*H04L 67/141* (2022.01)
*G06T 19/00* (2011.01)
*H04L 9/40* (2022.01)
*H04L 67/146* (2022.01)

(52) U.S. Cl.
CPC ........ *H04L 67/1012* (2013.01); *G06T 19/006* (2013.01); *H04L 63/166* (2013.01); *H04L 67/141* (2013.01); *H04L 67/146* (2013.01)

(58) Field of Classification Search
None
See application file for complete search history.

(56) References Cited

U.S. PATENT DOCUMENTS

| 5,475,421 A | 12/1995 | Palmer |
| 5,594,859 A | 1/1997 | Palmer |
| 8,613,620 B2 | 12/2013 | Barasch |
| 9,100,200 B2 | 8/2015 | Nerst |
| 10,085,124 B2 * | 9/2018 | Patel .................. H04L 65/1069 |
| 10,152,590 B2 * | 12/2018 | Liu ........................ G06F 16/00 |
| 10,298,882 B1 | 5/2019 | Galloway |

(Continued)

FOREIGN PATENT DOCUMENTS

CN 113190778 A 7/2021

OTHER PUBLICATIONS

Lego now has a multiplayer AR brick-building lens in Snapchat—CNET, https://www.cnet.com/tech/services-and-software/lego-now-has-a-multilayer-ar-brick-building-lens-in-snapchat/ retrieved Dec. 13, 2021, 7 pages.

(Continued)

*Primary Examiner* — Quang N Nguyen
(74) *Attorney, Agent, or Firm* — Faegre Drinker Biddle & Reath LLP

(57) ABSTRACT

Methods and systems are directed to a content services platform. The content services platform may include a processor and a memory storing instructions that, when executed by the processor, configure the content services platform to perform a method. The method may include receiving a request to initiate a shared session from a first client, the request including a first client identifier. Based on the received request, a session identifier may be provided to the first client associated with the first client identifier. A request from a second client may be received and may be associated with the session identifier. Thus, when message data from the first client is received, the message data may be added to a queue associated with the session identifier such that the message data may be provided from the queue to the second client based on the session identifier.

17 Claims, 12 Drawing Sheets

(56) References Cited

U.S. PATENT DOCUMENTS

| | | |
|---|---|---|
| 10,979,481 B2 | 4/2021 | Jayaweera |
| 11,394,757 B2 | 7/2022 | Takahashi |
| 11,416,202 B2 | 8/2022 | Hinohara |
| 2014/0028784 A1* | 1/2014 | Deyerle ................ H04L 65/403 |
| | | 715/756 |
| 2017/0235537 A1 | 8/2017 | Liu et al. |
| 2018/0121214 A1 | 5/2018 | Faulkner |
| 2019/0045014 A1 | 2/2019 | Shaw et al. |
| 2019/0075065 A1 | 3/2019 | Arastafar |
| 2020/0045264 A1 | 2/2020 | Galloway |
| 2021/0044645 A1 | 2/2021 | Jayaweera |
| 2021/0092170 A1 | 3/2021 | Takahashi |
| 2021/0168423 A1* | 6/2021 | Singh ................. G06Q 30/0251 |
| 2022/0417617 A1* | 12/2022 | Zhao ................. H04N 21/8358 |

OTHER PUBLICATIONS

Gartenberg, Chaim, et al., "Snapchat gets augmented reality Legos you can build with a friend" The Verge, May 20, 2021.

Brew, Jeannine, "Verizon and Snap Inc. debut first-ever 5G Landmarker Lens," Nov. 17, 2020 Products & Plans/Home & Entertainment, News Center-Verizon works Blog.

Spark AR Team "Spark AR Previews Multipeer API for Video Calling," https://sparkar.facebook.com/blog/spark-ar-previews-multipeer-api-for-ar-video-calling/ Jun. 2, 2021.

Notice of Allowance dated Sep. 2, 2022 issued in U.S. Appl. No. 17/394,391.

International Search Report dated Feb. 8, 2023 in International Application No. PCT/SG2022/050510 (3 pages).

* cited by examiner

| SESSION_ID | OBJECT INFORMATION | USER_ID | TIME STAMP |
|---|---|---|---|
| ABEF43 | 1 | USER_1 | X |
| ABEF43 | 2 | USER_2 | X+Y |
| ABEF43 | n... | n... | Z |

FIG. 5

SHARE BASED AUGMENTED REALITY CONTENT SERVICE SYSTEM

BACKGROUND

The web and other applications have been largely built using request/response paradigms associated with the hypertext transfer protocol (HTTP). For example, when a user loads a webpage, further processing and/or display of information occurs until the user clicks onto the next page. While AJAX was introduced to make the web feel more dynamic, HTTP communication tends to be steered by the client, which requires user interaction or periodic polling to load new data from the server. Technologies that enable a server to send data to a client the very moment new data is available carry the overhead of HTTP, which doesn't make such technologies well suited for low latency applications and tend not to be very scalable. Stated differently, current technologies do not provide scalable solutions for instant real-time augmented reality content sharing.

It is with respect to these and other general considerations that the aspects disclosed herein have been described. Also, although relatively specific problems may be discussed, it should be understood that the examples should not be limited to solving the specific problems identified in the background or elsewhere in this disclosure.

BRIEF SUMMARY

In accordance with examples of the present disclosure, a content service system that supports real-time content sharing exhibiting low end-to-end latency is described. The content service system can facilitate the sending of augmented reality content from a first client to a second client, where the end-to-end latency measured from the first client to the second client may be a few hundred milliseconds. Further, the content service system described herein may be scalable based on the change in customer traffic such that performance metrics (e.g., message delivery rate, latency) remain the same or similar as the traffic increases or as the traffic decreases. Accordingly, the content service system can support augmented reality applications involving multiple clients located in different geographical locations.

In accordance with at least one example of the present disclosure, a method for synchronizing message data between at least two clients is described. The method may include receiving a request to initiate a shared session from a first client, the request including a first client identifier; based on the received request, providing a session identifier to the first client associated with the first client identifier; associating the first client identifier with the session identifier; receiving a request from a second client to be associated with the session identifier; associating the second client identifier with the session identifier; receiving message data from the first client; adding the message data to a queue associated with the session identifier; adding the message data together with the session identifier to a database; and providing the message data from the queue to the second client based on the session identifier.

In accordance with at least one example of the present disclosure, a content services platform is described. The content services platform may include a processor; and a memory storing instructions that, when executed by the processor, configure the content services platform to: receive a request to initiate a shared session from a first client, the request including a first client identifier; based on the received request, provide a session identifier to the first client associated with the first client identifier; associate the first client identifier with the session identifier; receive a request from a second client to be associated with the session identifier; associate the second client identifier with the session identifier; receive message data from the first client; add the message data to a queue associated with the session identifier; add the message data together with the session identifier to a database; and provide the message data from the queue to the second client based on the session identifier.

In accordance with at least one example of the present disclosure, a non-transitory computer-readable storage medium is described; the computer-readable storage medium including instructions that when executed by a computer, cause the computer to: receive a request to initiate a shared session from a first client, the request including a first client identifier; based on the received request, provide a session identifier to the first client associated with the first client identifier; associate the first client identifier with the session identifier; receive a request from a second client to be associated with the session identifier; associate the second client identifier with the session identifier; receive message data from the first client; add the message data to a queue associated with the session identifier; add the message data together with the session identifier to a database; and provide the message data from the queue to the second client based on the session identifier.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

To easily identify the discussion of any particular element or act, the most significant digit or digits in a reference number refer to the figure number in which that element is first introduced.

FIG. 5 depicts an example data structure in accordance with examples of the present disclosure.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
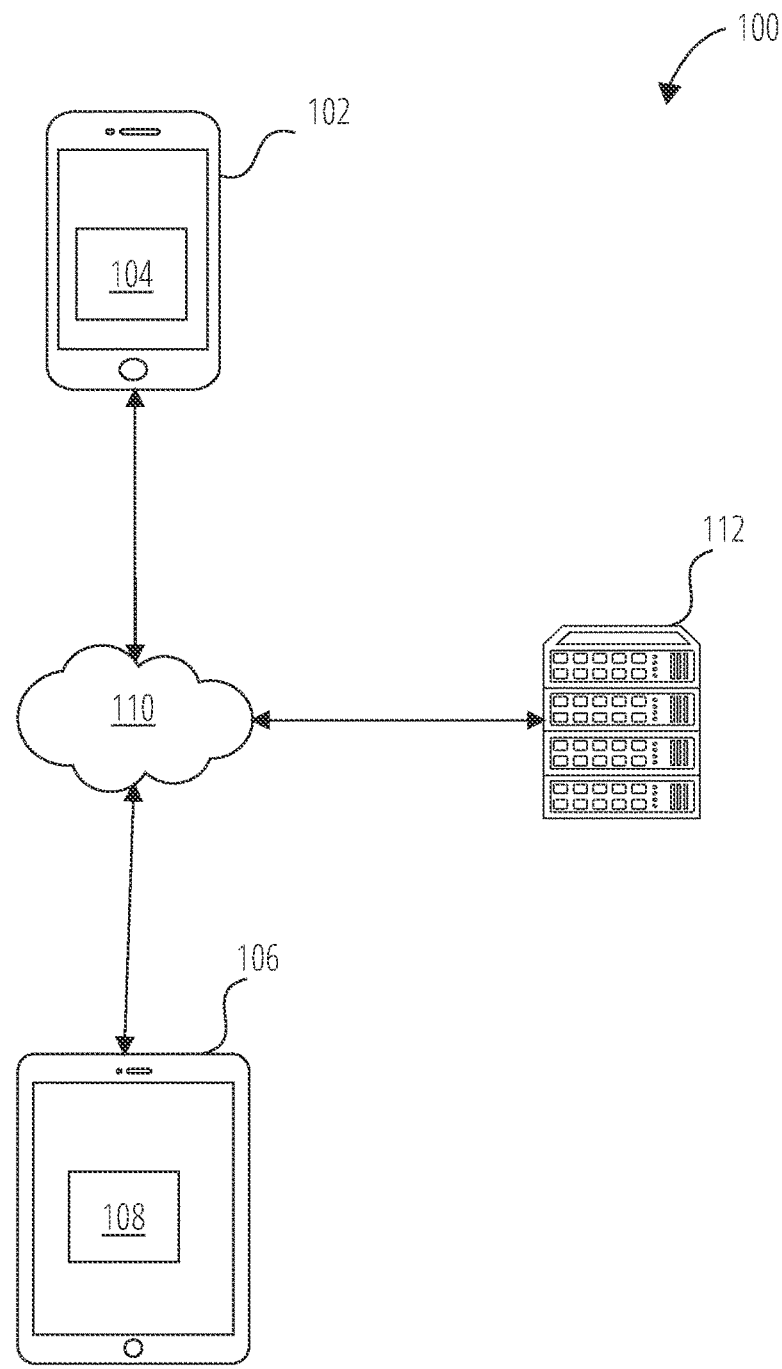
FIG. 1 depicts a diagram of a content service system, which provides an architecture for supporting a content services platform in accordance with examples of the present disclosure.

FIG. 1 is a diagram of a content service system 100, which provides an architecture for supporting a content services platform 112 in accordance with examples of the present disclosure. The content service system 100 may include a computing device 102, a computing device 106, a communication network 110, and a content services platform 112. As used herein, the term "computing device" may refer to any component (or collection of components) capable of establishing a connection with a communications network, such as the communication network 110. In examples, a computing device may be a smartphone, a tablet, a smart wearable device, a smart home device, and/or a general purpose computer. A computing device, such as the computing device 102 and/or computing device 106, may include one or more applications (e.g., application 104 and/or application 108, respectively) that facilitate the sharing of content, such as augmented reality content. Accordingly, content acquired or otherwise created at the computing device 102 may be synchronized or otherwise provided to the computing device 106 via the communication network 110 and content services platform 112. Such content may be provided in real-time or substantially in real-time. The content services platform 112 may be accessed by the computing devices through a cellular network deployed by a carrier, a WiFi network, a RAN, other wireless networks, a wired internet protocol (IP) network, combinations thereof, or the like. The communication network 110 may include one or more components configured to provide wireless or wired network access, that include but are not limited to cellular communications networks, We-Fi access points, or the like. Although the computing device 102 and computing device 106 are depicted in FIG. 1, it should be understood that the content service system 100 may include additional computing devices that are capable of receiving content and interacting with the content services platform 112.

In accordance with examples of the present disclosure, the content services platform 112 may use container technology for virtualization of a telecommunications system architecture, such as, the virtualization of one or more servers and/or services provided as part of the content service system 100. Virtualization using container technology may allow the content services platform 112 to adopt a micro-services model in which service clusters are considered the building blocks of the system architecture. For example, each function provided by the content services platform 112 may be virtualized in a unique service cluster, and each service cluster may perform a different function in the content services platform 112. Service clusters may be hosted on virtual machines in an example cloud network. An example cloud network may include a plurality of geographically diverse deployment sites (e.g., data centers) where various virtual machines are physically deployed. Decomposition of the system into a set of services allows each service (e.g., each function provided by the content services platform 112) to be independently deployed and managed. Thus, system resilience may be improved as failures are localized to individual services.

In some examples, the communication network 110 incorporates distributed databases, clustering technologies, data analytics tools, and messaging middleware to provide a robust, scalable platform. The content services platform 112 may use fully virtualized components with a layered approach, which allows the content services platform 112 to be integrated into various public and private cloud environments.

In accordance with examples of the present disclosure, the content services platform 112 may make available an augmented reality session that is shared between at least the computing device 102 and computing device 106. Thus, an application 104 of the computing device 102 may initiate a websocket connection with the content services platform 112 by creating a websocket request that is sent to the content services platform 112. A websocket may be a persistent connection between a client, such as the computing device 102, and a server, such as a server that is part of the content services platform 112. In general, a websocket provides a bidirectional, full-duplex communications channel that operates over HTTP through a TCP/IP socket connection. Thus, a websocket facilitates message passing between a device (e.g., computing device 102 and/or computing device 106) and server (e.g., a server in the content services platform 112) and enables interaction between a device application (such as application 104 and/or application 108) and a web server with lower overhead than half-duplex alternatives such as HTTP polling, thereby facilitating real-time data transfer from the device (e.g., computing device 102 and/or computing device 106) and to the server (e.g., a server that is part of the content services platform 112). In some examples, the data transferred from the application 104 of the computing device 102 may be received at the content services platform 112 and forwarded to the application 108 of the computing device 106, thereby enabling real-time communication between the computing device 102 and the computing device 106. In examples, the data communicated between the computing device 102 and computing device 106 may be instant message type text messages, and/or graphics, texts, augmented reality content and/or other objects rendered to a display of one of the computing device 102 and/or computing device 106.

The content services platform 112 may receive the websocket request provided by the computing device 102 and generate a session identifier as part of the websocket session setup; the session identifier may be provided to the application 104 of the computing device 102. In examples, messages between the computing device 102 and the content services platform 112 may be associated with the session identifier. Accordingly, the content services platform 112 may maintain or otherwise manage each of the messages; such messages may be stored in a persistent data storage. In examples, the computing device 102 may invite another computing device (e.g., the computing device 106) to join the session, and another computing device, such as the computing device 106 may join the session in response to the invitation (e.g., because the computing device 102, content services platform 112, or otherwise provided the session identifier), and the content services platform 112 can provide the computing device 106 with all messages associated with the session identifier provided to, occurring, or otherwise exchanged with the content services platform 112 before the computing device 106 joined the session. Accordingly, the messages provided to the newly joined computing device 106 may be the same messages previously provided to the computing device 102 and/or other computing devices that are part of the same session. Alternatively, or in addition, computing devices who are accidentally disconnected can reconnect and restore all messages of the same session from the persistent storage. That is, the session identifier may allow the synchronization of the content between computing devices of the same session.

Alternatively, or in addition, when the communication session is over (e.g., none of the computing devices communicate with the content services platform 112, for example), the content services platform 112 may perform a session teardown and remove or otherwise disassociate such messages with the session identifier. Accordingly, such messages may be removed, erased, or otherwise deleted from the content services platform 112. In examples, a computing device or the content services platform 112 may initiate the session teardown.

Figure 2:
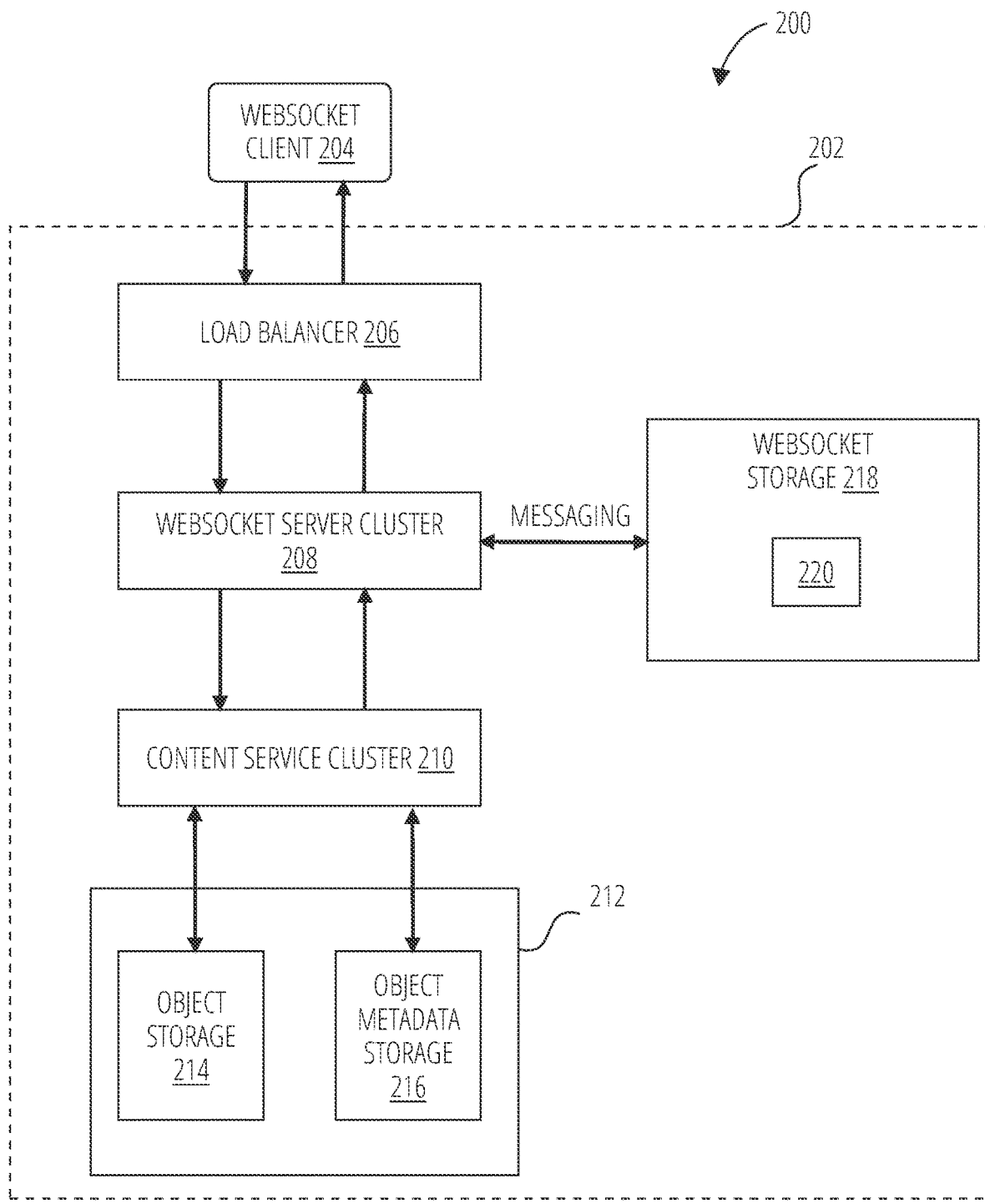
FIG. 2 depicts details associated with the content service system in accordance with examples of the present disclosure.

FIG. 2 depicts details associated with the content service system 200 in accordance with examples of the present disclosure. The content service system 200 may be the same as or similar to the content service system 100 previously described. In examples, a content services platform 202 may be the same as or similar to the content services platform 112 previously described. The content services platform 202 may include a load balancer 206, a websocket server cluster 208, a content service cluster 210, and database 212 which may include object storage 214 and object metadata storage 216. The content services platform 202 may also include websocket storage 218. Each of the load balancer 206, websocket server cluster 208, content service cluster 210, and database 212, and websocket storage 218 may be hosted on virtual machines in an example distributed cloud network. A websocket client 204, such as an application 104 (FIG. 1) of the computing device 102 (FIG. 1) may initiate a request to the load balancer 206 of the content services platform 202. The request may be to send message data to another application 108 (FIG. 1) and may include a session creation request or other data (e.g., graph data) and an existing session identifier. The load balancer 206 may be configured to evenly distribute client traffic to the websocket server cluster 208, where the websocket server cluster 208 may include a plurality of websocket servers. Accordingly, and based on resource expenditure, the load balancer 206 may determine or otherwise identify at least one websocket server to pass message data received at the load balancer 206 from the websocket client 204.

The websocket server cluster 208 is configured to maintain a websocket connection with the websocket client 204 as well as send and receive message data to and from the websocket client 204. In examples, a websocket server from the websocket server cluster 208 may send the message data received from the websocket client 204 to the websocket storage 218, where the message data is added to the queue 220 to be later pulled from and then sent to another client. In addition, to allow for asynchronous recovery of message data, the websocket server may backup or otherwise maintain a copy of the message data using the content service cluster 210. The copy of the message data made at the content service cluster 210 may be utilized to restore the message data for a user's application if the application is disconnected or if the application joins in the middle of an ongoing session. That is, the content service cluster 210 may be responsible for storing the message data and/or serving one or more requests made from the websocket client 204 for retrieving data. In examples, the content service cluster 210 may cause the message data to be stored in the database 212, where an object portion of the message data may be stored as object storage 214 and a metadata portion of the message data may be stored as object metadata storage 216 in a database 212. In examples, the content service cluster 210 may retrieve message data from the database 212. That is, the content service cluster 210 may retrieve an object portion of the message data stored in object storage 214 and a metadata portion of the message data stored in the object metadata storage 216. In examples, the content service cluster 210 may retrieve message data from the database 212, where an object portion of the message data may be retrieved from the object storage 214 and the metadata portion of the message data may be retrieved from the object metadata storage 216 in the database 212.

Figure 3:
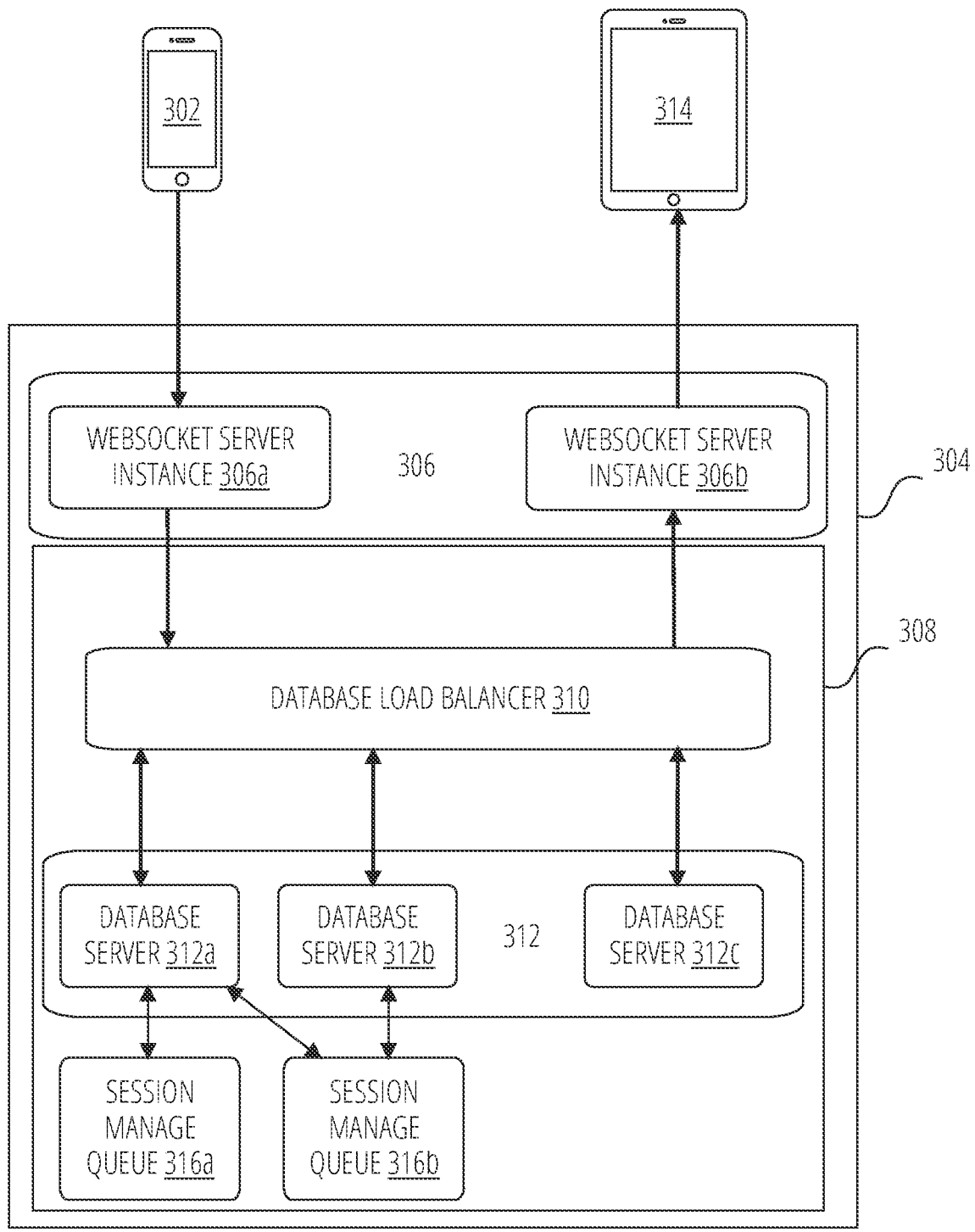
FIG. 3 depicts additional details directed to storing message data with websocket storage in accordance with examples of the present disclosure.

FIG. 3 depicts additional details directed to storing message data with websocket storage in accordance with examples of the present disclosure. As an example, a computing device 302, which may be the same as or similar to the computing device 102, may send a message destined to the computing device 314. The computing device 314 may be the same as or similar to the computing device 106. The message may be received at a websocket server instance 306a of a websocket server cluster 306 in the content services platform 304. The websocket server instance 306a of the websocket server cluster 306 may provide the message data to websocket storage 308. The websocket storage 308 may include a database load balancer 310 and database servers 312. The database load balancer 310 may identify and/or select a database server (312a-312c). The selected database server (312a-312c) may add the message to a session manage queue (e.g., 316a) via a database operation, such as in a push operation. At substantially the same time, the websocket server instance 306b may initiate a call operation to fetch any available messages from the session manage queue 316a. Different sessions have separate session manage queues. For example, the session manage queue 316b may be for a different session and may be accessible via the database server 312a and/or database server 312b. In instances where another different session is established, another session manage queue may be created and may be in communication with one or more of the database servers 312a-c. For example, the database server 312c may be in communication with a newly session manage queue if needed, as session manage queues are created according the request of a new session and then removed when the session is no longer needed. Thus, session manage queues (e.g., session manage queues 316a-b) are created and removed according to need. Further, database servers 312a-c may manage one or more session manage queues (e.g., 316a-b) depending on load and availability.

In some examples, the session manage queue 316a and/or session manage queue 316b may be stored in memory, such as random access memory, volatile memory, or other memory having low access times. Clients (e.g., computing device 102 and/or computing device 106) within the same session can be connected to different websocket server instances (e.g., websocket server instance 306a and/or websocket server instance 306b), and communicate in a distributed manner without having to know or specify which server instances they are connected to. Of course, while there are three database servers 312 depicted in FIG. 3, more or less database servers 312 are contemplated. In examples, the computing device 302 may send data to the computing device 314 via the content services platform 304. In addition, the computing device 314 may send data to the computing device 302 via the content services platform 304. Thus, both the computing device 302 and the computing device 314 can have the same, or synchronized, augmented reality content displayed at their respective device (e.g., by including the same augmented reality content in video and/or image data for example).

In some examples, the session manage queue 316a may be divided and include session information storage and a message queue. The session information storage may include session data and a list of clients that are in the same session. For example, if the application 104 of the computing device 102 and the application 108 of the computing device 106 are communicating in the same session, the session information storage may include unique client identifiers identifying the application and/or the computing device. In some examples, the message queue contains content data to be shared; that is, the content data to be shared may include augmented reality content data. Accordingly, the message queue may include information specific to an object, text, color, coordinate, etc. describing or otherwise providing information to recreate content, such as augmented reality content.

Figure 4:
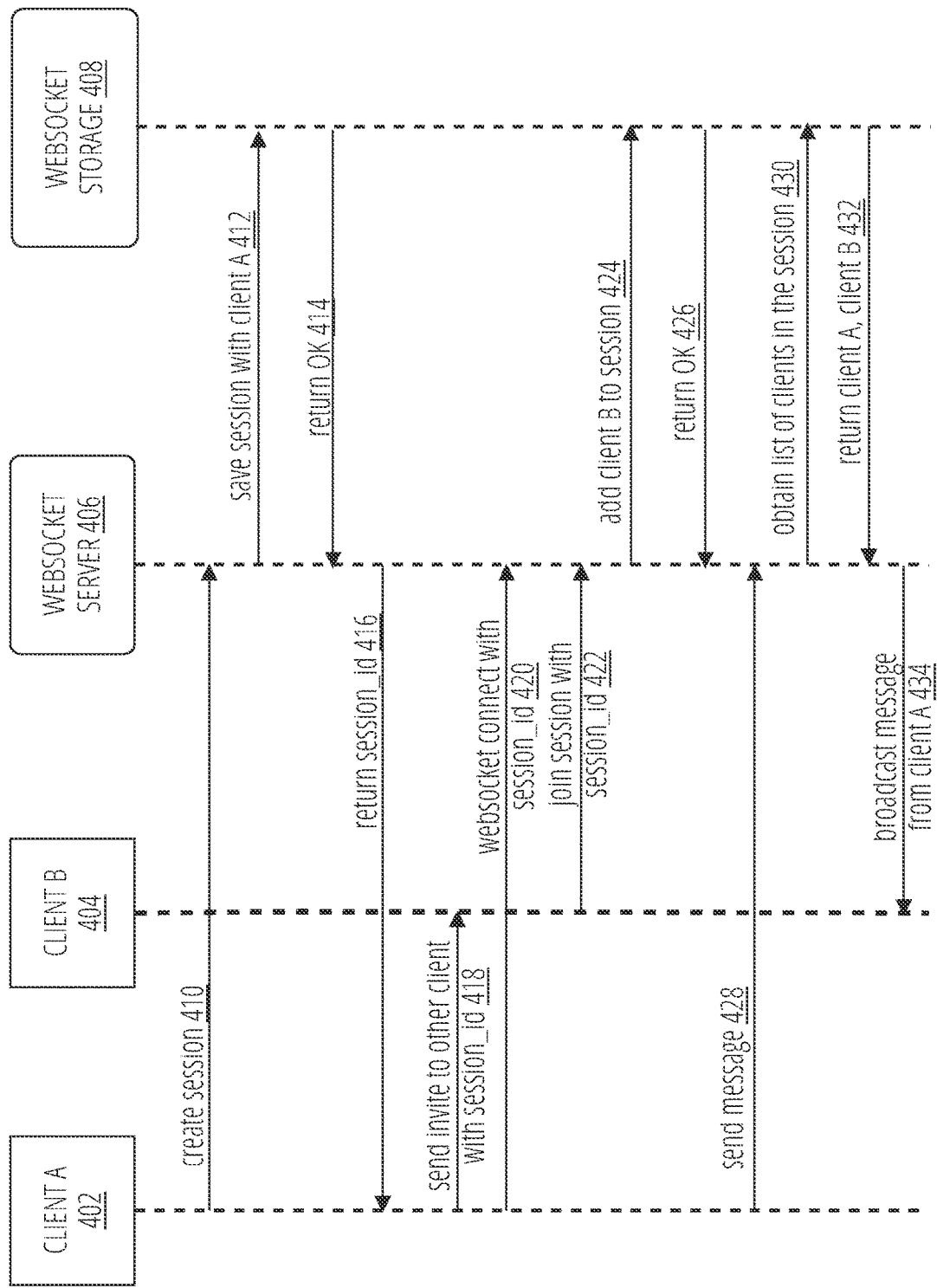
FIG. 4 depicts details of a messaging diagram for distributed communications between a websocket server deployed in a distributed system and different clients that communicate with different websocket server instances in accordance with examples of the present disclosure.

FIG. 4 depicts details of a messaging diagram for distributed communications between a websocket server deployed in a distributed system and different clients that communicate with different websocket server instances in accordance with examples of the present disclosure. More specifically, a client, such as client A 402, may send a create session request at 410 to the websocket server 406 in order to initiate a new session. The client A 402 may be the same as or similar to the computing device 102 previously described and the websocket server 406 may correspond to a websocket server instance 306 as previously described. In examples, the new session may be for a shared augmented reality session. The websocket server 406 may generate a session identifier and add the generated session identifier to the websocket storage 408 at 412, and designate the session identifier as an active session identifier. In some examples, a client identifier uniquely identifying client A 402 may be associated with the session identifier at the websocket storage 408. Upon adding the session identifier to the websocket storage 408 and/or associating the client identifier for client A 402 with the session identifier, the websocket storage 408 may provide an "ok" or acknowledgement indicating that such session has been added to the websocket sever 406 at 414. In some examples, the websocket storage 408 may further create an initial queue or list to add, or log, message data sent from one or more clients. The session identifier may then be sent to the client A 402 at 416.

At 418, the client A 402 may invite client B 404 to a shared session, where the shared session may be a shared augmented reality session that provides an interactive experience of a real-world environment where objects that reside in the real world may be enhanced, painted, drawn, made to be interactable, etc. by computer-generated perceptual information. In examples, the information added to the real-word environment may be shared among users participating in the shared session. Accordingly, client A 402 may send an invitation that includes the session identifier to the client B 404, where client B 404 may be the same as or similar to the computing device 106. At 420, the client A 402 may connect to a session using a websocket connection and the session identifier received at 416. At 422, the client B 404 may connect to the session using a websocket connection and the session identifier received at 418. The websocket server 406 may then cause the newly added client, client B 404, to be added to the websocket storage 408 or otherwise have a client identifier uniquely identifying client B 404 be associated with the session identifier at 424. Once added, the websocket storage 408 may return an "ok" indicating that client B 404 has joined in such session at 426 to the websocket server 406.

In an example, the client A 402 may desire to send a message to the client B 404 and/or to other participants of the session; accordingly, message data may be sent to the websocket server 406 at 428. The websocket server 406 may generate a request for those clients that are part of or otherwise associated with the session identifier at 430 and send the request to the websocket storage 408 at 430; the websocket storage 408 may return the list of clients at 432. In this example, client identifiers for client A 402 and client B 404 may be returned as belonging to the same list. The websocket server 406 may then determine which participants or members (e.g., via the client identifier) in the list to send the message data to at 434. For example, if client A 402 sends a message at 428, the websocket server 406 may receive the list of clients from the websocket storage 408, and determine that based on the list of names associated with a session identifier, those clients other than client A 402 should receive the message. Accordingly, the websocket server 406 may send such message as a broadcast message from the server to the clients other than client A 402 (e.g., client B 404 shown in FIG. 4) at 434. Therefore, the client B 404 can receive the message send from client A 402.

Figure 5:
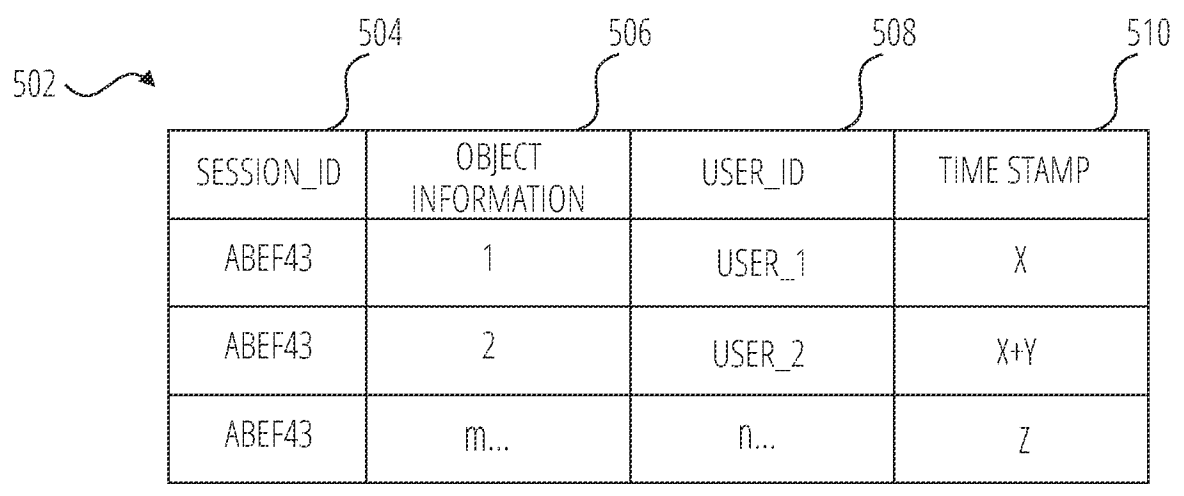

FIG. 5 depicts an example data structure 502 in accordance with examples of the present disclosure. The data structure 502 may reside at the websocket storage 408 (FIG. 4) and may include a session identifier 504. The session identifier 504 is generated by the websocket server 406 and uniquely identifies a shared augmented reality session. In examples, to create and/or synchronize content to be displayed at a display device, object information 506 used to create such objects at local sessions associated with clients (e.g., computing devices) may be included in the data structure 502. Accordingly, the data structure 502 may include object information 506, and a time stamp 510. The object information 506 may identify the graphic object (e.g., line, point, dot, shape, image, etc.) associated with an object created by each client (e.g., computing device). In some examples, an object may include a plurality of objects; accordingly, the object information 506 may refer to another object or may include the object specific information as described above. For example, a plurality of lines or dots may create a shape such as a square or circle; the object information 506 may associate other object information 506 with the object or shape. In other instances, the object information 506 may include other information describing the object. For example, the object information 506 may include coordinate information, color information, shape type information, brush stroke type information.

The data structure 502 may also include a user identifier 508 that identifies a user that creates the object information 506. Accordingly, the websocket server may determine which participants to send message data to based on the user identifier 508. The time stamp 510 can be used to replay, backup, and/or edit the object information 506. In some examples, the time stamp 510 may be offset from a starting point, such as a beginning of a recording, or may be associated with a current or present time and date.

Figure 6:
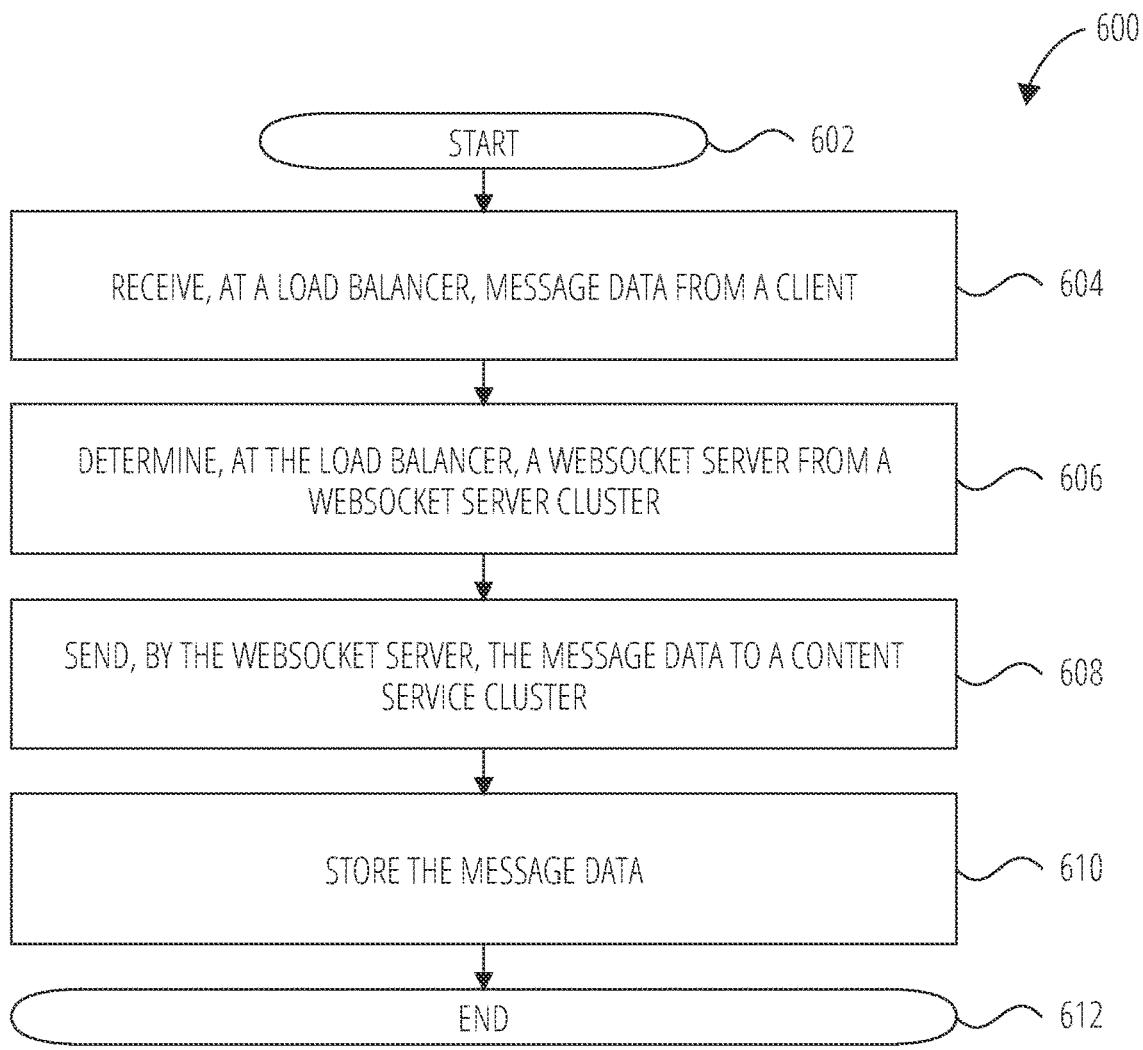
FIG. 6 depicts a method for receiving and storing message data at a storage location associated with a content service cluster in accordance with examples of the present disclosure

Referring now to FIG. 6, a simplified method 600 for receiving and storing message data at a storage location associated with a content service cluster is described in accordance with examples of the present disclosure. A general order for the steps of a method 600 is shown in FIG. 6. Generally, the method 600 starts at 602 and ends at 612. The method 600 may include more or fewer steps or may arrange the order of the steps differently than those shown in FIG. 6. The method 600 can be executed as a set of computer-executable instructions executed by a computer system and encoded or stored on a computer readable medium. In an illustrative aspect, the method 600 is executed by one or more servers in a cloud environment. For example, one or more aspects of the method 600 may be executed by the content services platform 112. However, it should be appreciated that aspects of the method 600 may be performed by one or more processing devices in addition to the content services platform 112. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, etc. described in conjunction with FIGS. 1-5.

The method 600 starts at 602 and proceeds to 604, where message data from a client is received at a load balancer. For example, an application 104 executing on the computing device 102 may invite a computing device 106 to a session and share data with an application 108 executing on the computing device 106. Accordingly, message data sent by the computing device 102 may be received at the load balancer, for example a load balancer 206. In addition to shared content included in the message data, a session identifier may be included in the message data such that the application 104 and/or computing device 102 together with the application 108 and/or computing device 106 may communicate using a same session identifier. The method 600 may proceed to 606, where the load balancer may determine a websocket server from a websocket server cluster. In examples, a selected websocket server may correspond to a websocket server that has available resources, is closer in physical proximity to one or more clients associated with the session identifier, have a roundtrip latency that is below other websocket servers, or the like. In some examples, the websocket server cluster may be the same as or similar to the websocket server cluster 208. The load balancer may then forward or otherwise send the message data received from the client to the selected websocket server. In examples, the determined websocket server may also forward or otherwise send the message data to websocket storage, such as websocket storage 218, where the message data may be added to a queue, such as queue 220, to be later pulled from and then sent to another client.

The method 600 may then proceed to 608, where the determined websocket server may provide the received message data to a content service cluster. At 610, the message data may be stored. For example, the content service cluster may cause the message data to be stored in a database, where an object portion of the message data may be stored in object storage (e.g., object storage 214 as shown in FIG. 2) and a metadata portion of the message data may be stored as object metadata storage (e.g., object metadata storage 216 as shown in FIG. 2). Once the message data is stored, the method 600 may end.

To allow for asynchronous recovery of message data, the websocket server may act as a backup or otherwise maintain a copy of the message data using the content service cluster. The copy of the message data made at the content service cluster may be utilized to restore the message data for a user's application if the application is disconnected or if the application joins in the middle of an ongoing session. That is, the content service cluster may be responsible for storing the message data and/or serving one or more requests made from the websocket client for retrieving data. In examples, the content service cluster may cause the message data to be stored in a database, where an object portion of the message data may be stored as object storage and a metadata portion of the message data may be stored as object metadata storage in a database.

Figure 7:
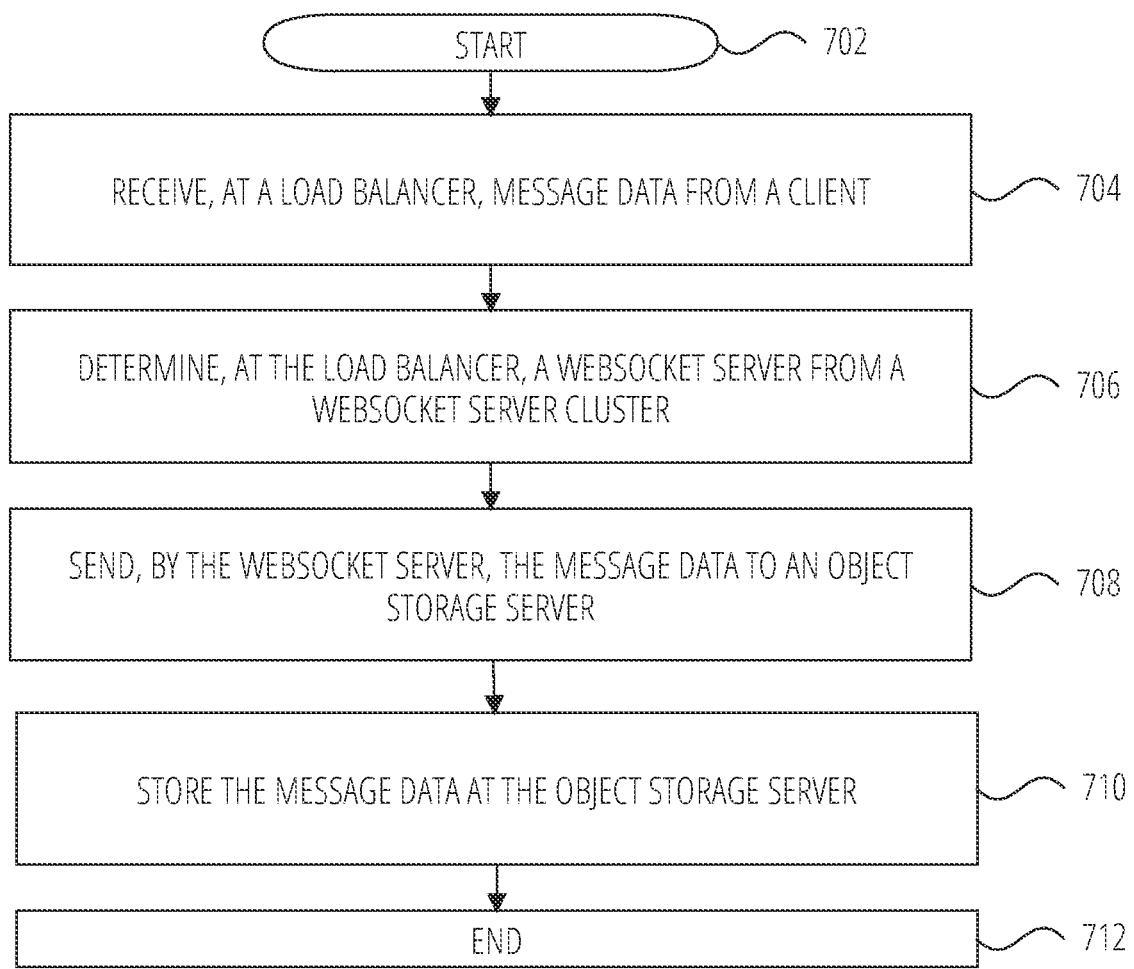
FIG. 7 depicts a method for receiving and storing message data in a queue associated with a websocket storage in accordance with examples of the present disclosure.

Referring now to FIG. 7, a simplified method 700 for receiving and storing message data in a queue associated with a websocket storage is described in accordance with examples of the present disclosure. A general order for the steps of a method 700 is shown in FIG. 7. Generally, the method 700 starts at 702 and ends at 712. The method 700 may include more or fewer steps or may arrange the order of the steps differently than those shown in FIG. 7. The method 700 can be executed as a set of computer-executable instructions executed by a computer system and encoded or stored on a computer readable medium. In an illustrative aspect, the method 700 is executed by one or more servers in a cloud environment. For example, one or more aspects of the method 700 may be executed by the content services platform 112. However, it should be appreciated that aspects of the method 700 may be performed by one or more processing devices in addition to the content services platform 112. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method 700 starts at 702 and proceeds to 704, where message data from a client (e.g., computing device 102) is received at a load balancer. For example, an application 104 executing on the computing device 102 may invite a computing device 106 and share data with an application 108 executing on the computing device 106. Accordingly, messaging data may be received at the load balancer, for example a load balancer 206. In addition to shared content included in the messaging data, a session identifier may be included in the messaging data such that the application 104 and/or computing device 102 together with the application 108 and/or computing device 106 may communicate using a same session identifier. The method 700 may proceed to 706, where the load balancer may determine a websocket server from a websocket server cluster to forward the received message data. In examples, a selected websocket server may correspond to a websocket server that has available resources, is closer in physical proximity to one or more clients associated with the session identifier, have a roundtrip latency that is below other websocket servers, or the like. In some examples, the websocket server cluster may be the same as or similar to the websocket server cluster 208.

The method 700 may then proceed to 708, where the determined websocket server may send the message data to an object storage server. In examples, the object storage server may include or otherwise access a database or memory to store the message data in a queue for example at 710. That is, the object storage server may push the message data into a queue for later retrieval. Once the message data is stored, the method 700 may end. In examples, the object storage server is the same as or similar to the websocket storage 218 and the queue is the same as or similar to the queue 220.

Figure 8:
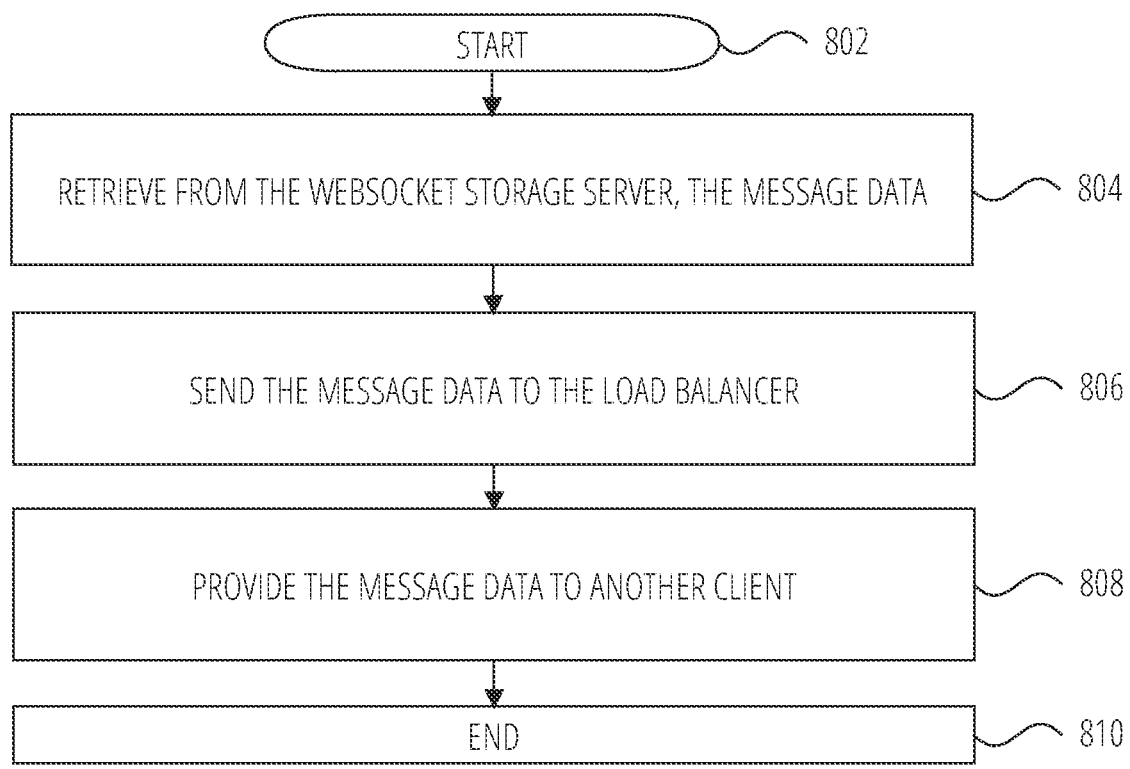
FIG. 8 depicts a simplified method for retrieving data in a queue associated with a websocket storage in accordance with examples of the present disclosure.

Referring now to FIG. 8, a simplified method 800 for retrieving data in a queue associated with a websocket storage is described in accordance with examples of the present disclosure. A general order for the steps of a method 800 is shown in FIG. 8. Generally, the method 800 starts at 802 and ends at 810. The method 800 may include more or fewer steps or may arrange the order of the steps differently than those shown in FIG. 8. The method 800 can be executed as a set of computer-executable instructions executed by a computer system and encoded or stored on a computer readable medium. In an illustrative aspect, the method 800 is executed by one or more servers in a cloud environment. For example, one or more aspects of the method 800 may be executed by the content services platform 112. However, it should be appreciated that aspects of the method 800 may be performed by one or more processing devices in addition to the content services platform 112. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method 800 starts at 802 and proceeds to 804, where at least one of a websocket server or an object storage server retrieves from websocket storage, message data previously pushed to a queue. For example, the queue 220 may include message data that originated at a first client. Once retrieved, the message data may be sent to other clients associated with the same session as the first client. In examples, each queue may be associated with a session identifier, where each session identifier may be associated with a plurality of unique client identifiers. Accordingly, based on the clients associated with the session identifier, the message data may be sent to clients at 808 other than the client that is originally sending the message data. Once the message data is retrieved from the queue, the message data may be sent to the load balancer, for example a load balancer 206 at 806. The load balancer may then send the message data to the other clients that are associated with the session identifier. The method 800 may then end at 810.

Figure 9:
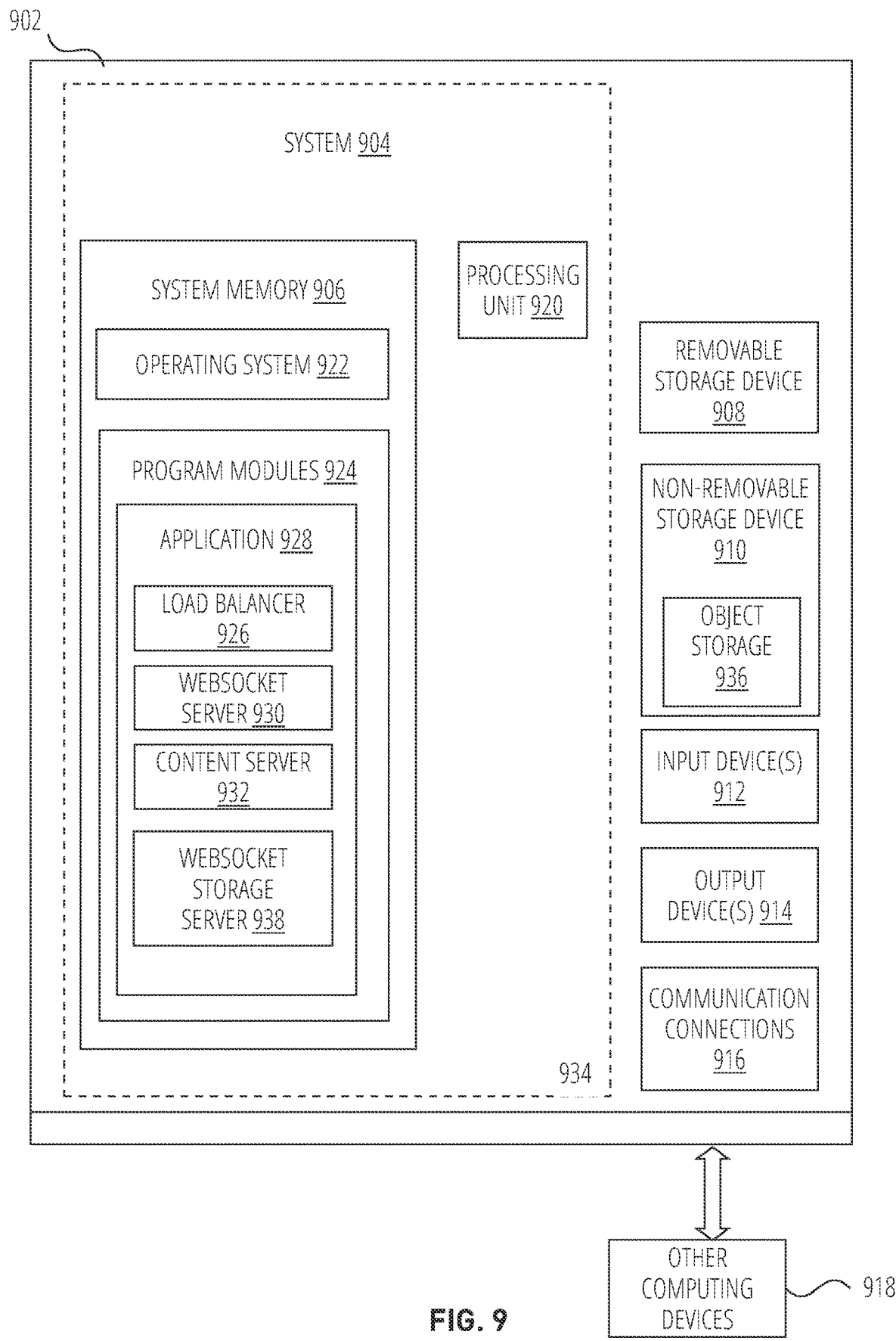
FIG. 9 depicts a block diagram illustrating physical components (e.g., hardware) of a computing system with which aspects of the disclosure may be practiced.

FIG. 9 is a block diagram illustrating physical components (e.g., hardware) of a computing system 902 with which aspects of the disclosure may be practiced. The computing system 902 components described below may be suitable for the computing and/or processing devices described above. In a basic configuration, the computing system 902 may include at least one processing unit 920 and a system memory 906. Depending on the configuration and type of computing system, the system memory 906 may comprise, but is not limited to, volatile storage (e.g., random-access memory (RAM)), nonvolatile storage (e.g., read-only memory (ROM)), flash memory, or any combination of such memories.

The system memory 906 may include an operating system 922 and one or more program modules 924 suitable for running software applications 928, such as one or more components supported by the systems described herein. As examples, system memory 906 may include the load balancer 926, the websocket server 930, the content server 932, and the websocket storage server 938. In some examples, the computing system 902 may perform one or more functions of the content services platform 112. Each function provided by the computing system 902 may be virtualized in a unique service cluster, and each service cluster may perform a different function of the content services platform 112. Service clusters may be hosted on virtual machines in an example cloud network. An example cloud network may include a plurality of geographically diverse deployment sites (e.g., data centers) where various virtual machines are physically deployed. Although the computing system 902 depicts a plurality of applications 928, the computing system 902 may include a single application 928. Accordingly, there may be multiple distributed computing systems 902 that together perform at least some of the functions of the content services platform 112.

In examples, the load balancer 926 may be the same as or similar to the load balancer 206. In some examples, the websocket server 930 is the same as or similar to a websocket server of the websocket server cluster 208. Similarly, the content server 932 is the same as or similar to a content server of the content service cluster 210. The websocket storage server 938 may be the same as or similar to a server for the websocket storage 218. The operating system 922, for example, may be suitable for controlling the operation of the computing system 902.

Furthermore, examples of the disclosure may be practiced in conjunction with a graphics library, other operating systems, or any other application program and are not limited to any particular application or system. This basic configuration of the computing system 902 is illustrated in FIG. 9 by those components within an item 934. The computing system 902 may have additional features or functionality. For example, the computing system 902 may also include additional data storage devices (removable and/or non-removable) such as magnetic disks, optical disks, or tape. Such additional storage is illustrated in FIG. 9 by a removable storage device 908 and a non-removable storage device 910. In examples, object storage 936 may be the same as or similar to the object storage 214.

As stated above, a number of program modules and data files may be stored in the computing system 902. While executing on the processing unit 920, the program modules 924 (e.g., applications 928) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, examples of the disclosure may be practiced in an electrical circuit, discrete electronic elements, packaged or integrated electronic chips containing logic gates, a circuit utilizing a microprocessor, or on a single chip containing electronic elements or microprocessors. For example, some instances of the disclosure may be practiced via a system-on-a-chip (SOC) where each or many of the components illustrated in FIG. 9 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 902 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing system 902 may also have one or more input device(s) 912 such as a keyboard, a mouse, a pen, a sound or voice input device, a touch or swipe input device, etc. The output device(s) 914, such as a display, speakers, a printer, etc., may also be included. The aforementioned devices are examples, and others may be used. The computing system 902 may include one or more communication connections 916, allowing communications with other computing devices 918, such as computing device 102 and/or computing device 106 for example. Examples of suitable communication connections 916 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 906, the removable storage device 908, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 902. Any such computer storage media may be part of the computing system 902. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
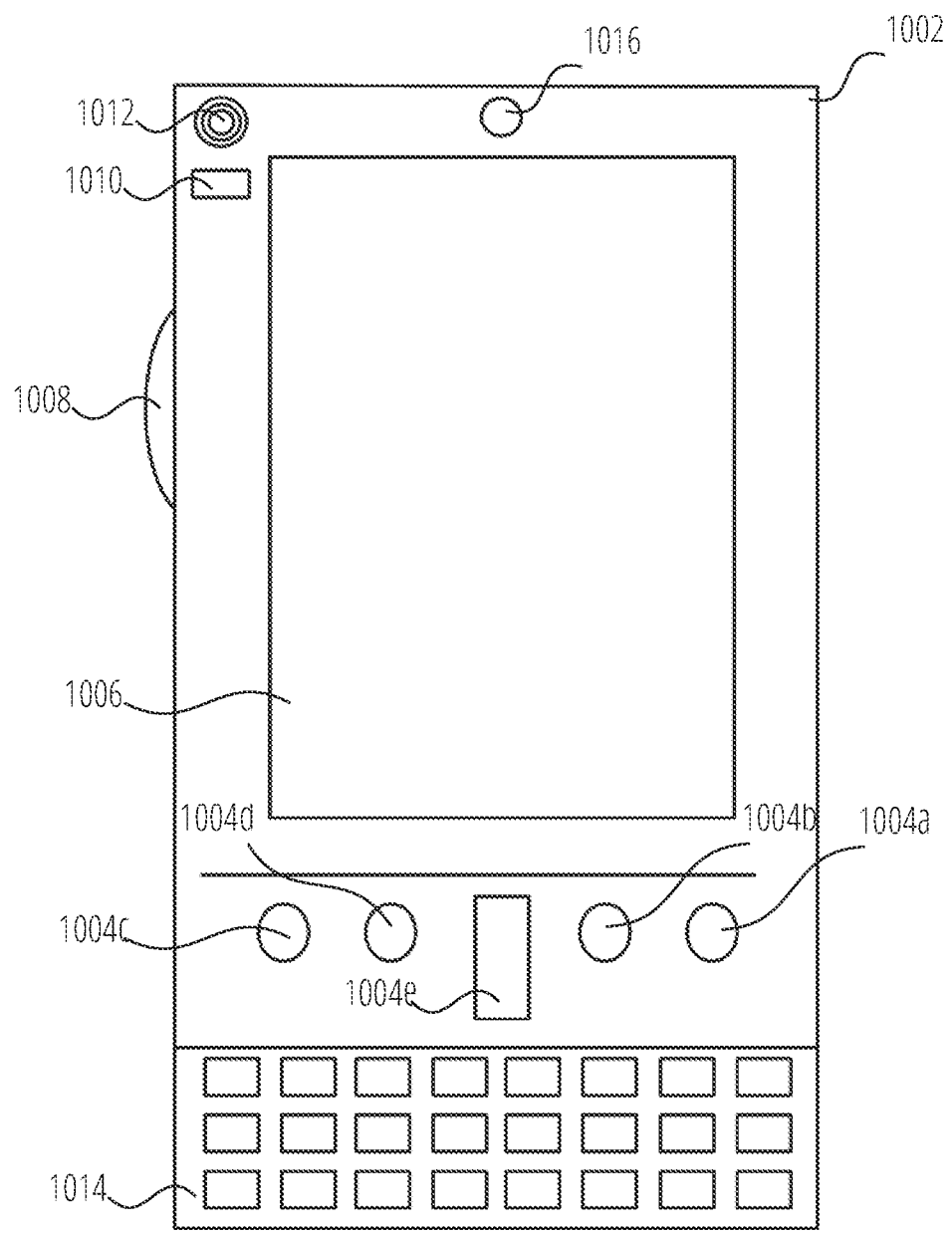
FIG. 10A depicts details of a computing system with which examples of the disclosure may be practiced.
Figure 10B:
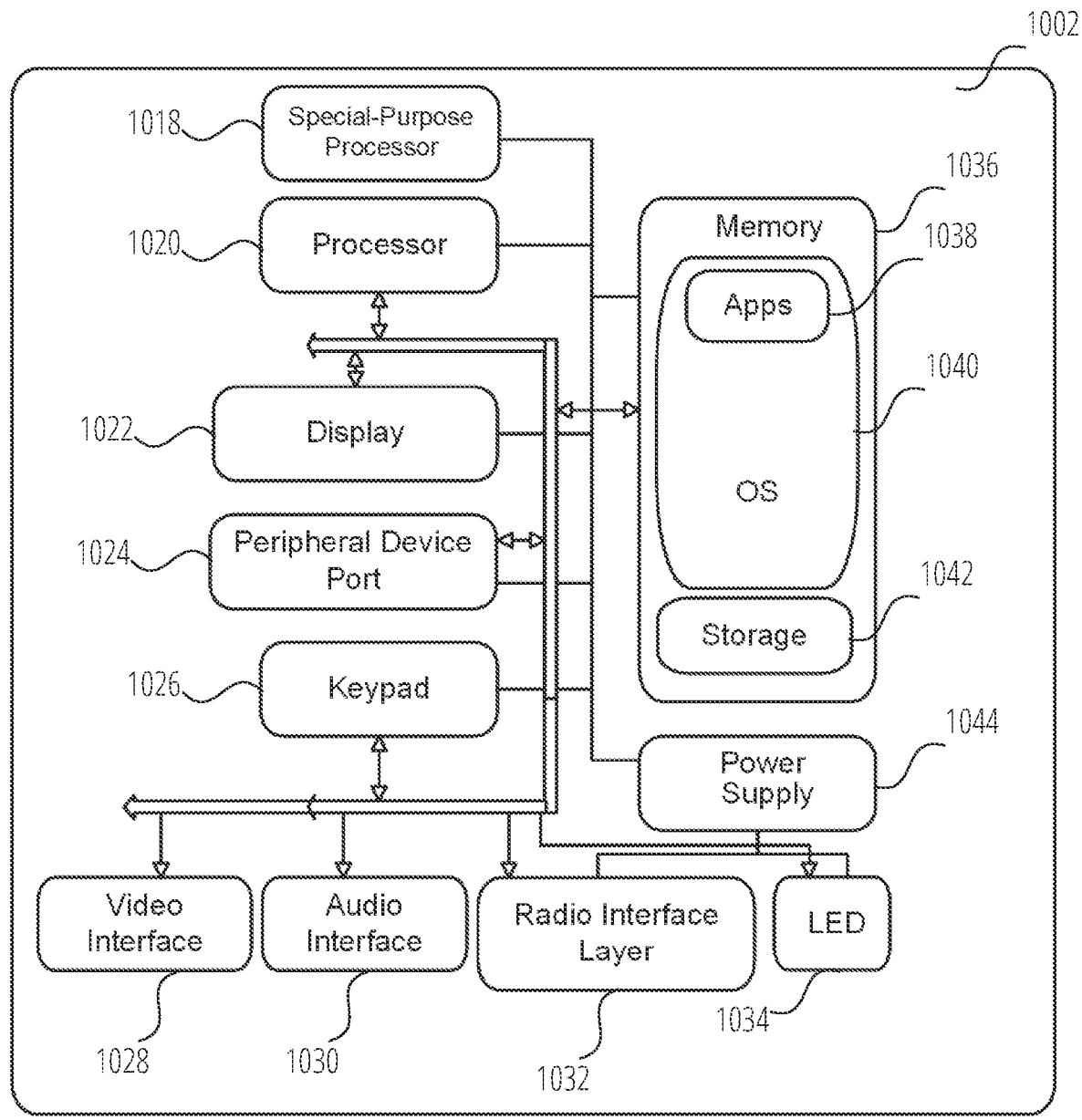
FIG. 10B depicts details of a computing system with which examples of the disclosure may be practiced.

FIG. 10A and FIG. 10B illustrate a computing system 1002, for example, a mobile telephone, a smart phone, wearable computer (such as a smart watch), a tablet computer, a desktop computer, a laptop computer, and the like, with which examples of the disclosure may be practiced. With reference to FIG. 10A, one aspect of the computing system 1002 for implementing the aspects is illustrated. In a basic configuration, the computing system 1002 is a desktop computer having both input elements and output elements. The computing system 1002 typically includes a display 1006 and one or more input buttons 1004a-1004e that allow the user to enter information into the computing system 1002. The display 1006 of the computing system 1002 may also function as an input device (e.g., a touch screen display).

If included, an optional side input element 1008 allows further user input. The side input element 1008 may be a rotary switch, a button, or any other type of manual input element. In alternative aspects, computing system 1002 may incorporate greater or fewer input elements.

In yet another alternative example, the computing system 1002 is a portable phone system, such as a cellular phone. The computing system 1002 may also include an optional keypad 1014/1026. Optional keypad 1014 may be a physical keypad or a "soft" keypad generated on the touch screen display.

In various examples, the output elements include the display 1006/1022 for showing a graphical user interface (GUI), a visual indicator 1010 (e.g., a light-emitting diode 1034), and/or an audio transducer 1012 (e.g., a speaker). In yet another aspect, the computing system 1002 incorporates input and/or output ports, such as an audio input (e.g., a microphone jack), an audio output (e.g., a headphone jack), and a video output (e.g., an HDMI port) for sending signals to or receiving signals from an external device.

FIG. 10B is a block diagram illustrating the architecture of one aspect of a mobile computing system. That is, the computing system 1002 can incorporate a system (e.g., an architecture) 1002 to implement some aspects. In some examples, the system 1002 is implemented as a "computing system" capable of running one or more applications (e.g., browser, e-mail, calendaring, contact managers, messaging clients, games, and media clients/players). In some aspects, system 1002 is integrated as a computing system, such as a desktop computer.

One or more application programs 1038 may be loaded into the 1036 and run on or in association with the operating system 1040. Examples of the application programs include phone dialer programs, e-mail programs, personal information management (PIM) programs, word processing programs, spreadsheet programs, Internet browser programs, messaging programs, maps programs, video platforms, video composition applications, and so forth. The computing system 1002 also includes a nonvolatile storage area 1042 within the memory 1036. The nonvolatile storage area 1042 may be used to store persistent information that should not be lost if the system 1002 is powered down. The application programs 1038 may use and store information in the nonvolatile storage area 1042, such as e-mail or other messages used by an e-mail application, and the like. A synchronization application (not shown) also resides on system 1002 and is programmed to interact with a corresponding synchronization application resident on a host computer to keep the information stored in the nonvolatile storage area 1042 synchronized with corresponding information stored at the host computer. As should be appreciated, other applications may be loaded into the nonvolatile storage area 1042 and run on the computing system 1002 described herein.

The computing system 1002 has a power supply 1044, which may be implemented as one or more batteries. The power supply 1044 might further include an external power source, such as an AC adapter or a powered docking cradle that supplements or recharges the batteries.

The computing system 1002 may also include a radio interface layer 1032 that performs the function of transmitting and receiving radio frequency communications. The radio interface layer 1032 facilitates wireless connectivity between the system 1002 and the "outside world" via a communications carrier or service provider. Transmissions to and from the radio interface layer 1032 are conducted under the control of the operating system 1040. In other words, communications received by the radio interface layer 1032 may be disseminated to the application programs 1038 via the operating system 1040 and vice versa.

The computing system 1002 may further include a video interface 1028 that enables an operation of an on-board camera via a peripheral port 1024 to record still images, video stream, and the like. A computing system 1002 may have additional features or functionality. For example, the computing system 1002 may also include additional data storage devices (removable and/or non-removable) such as magnetic disks, optical disks, or tape. Such additional storage is illustrated in FIG. 10B by the nonvolatile storage area 1042. The audio interface 1030 is used to provide audible signals to and receive audible signals from the user. For example, in addition to being coupled to the audio transducer 1012, the audio interface 1030 may also be coupled to a microphone to receive audible input, such as but not limited to facilitating a telephone conversation and/or to receiving audio while recording video for example. In accordance with embodiments of the present disclosure, the microphone may also serve as an audio sensor to facilitate control of notifications, as will be described below. The computing system 1002 may further include a video interface 1028 that enables an operation of an onboard camera 1016 to record still images, video stream, and the like. Components of the computing system 1002 may be directly coupled to the power supply 1044 so that when activated, they remain on for a duration dictated by the notification mechanism even though the processor 1020 and/or 1018 and other components might shut down for conserving battery power. The LED 1034 may be programmed to remain on indefinitely until the user takes action to indicate the powered-on status of the device.

Data/information generated or captured by the computing system 1002 and stored via the system may be stored locally on the computing system 1002, as described above, or the data may be stored on any number of storage media that may be accessed by the device via the radio interface layer 1032 or via a wired connection between the computing system 1002 and a separate computing system associated with the computing system 1002, for example, a server computer in a distributed computing network, such as the Internet. As should be appreciated, such data/information may be accessed via the computing system 1002 via the radio interface layer 1032 or via a distributed computing network. Similarly, such data/information may be readily transferred between computing systems for storage and use according to well-known data/information transfer and storage means, including electronic mail and collaborative data/information sharing systems.

Figure 11:
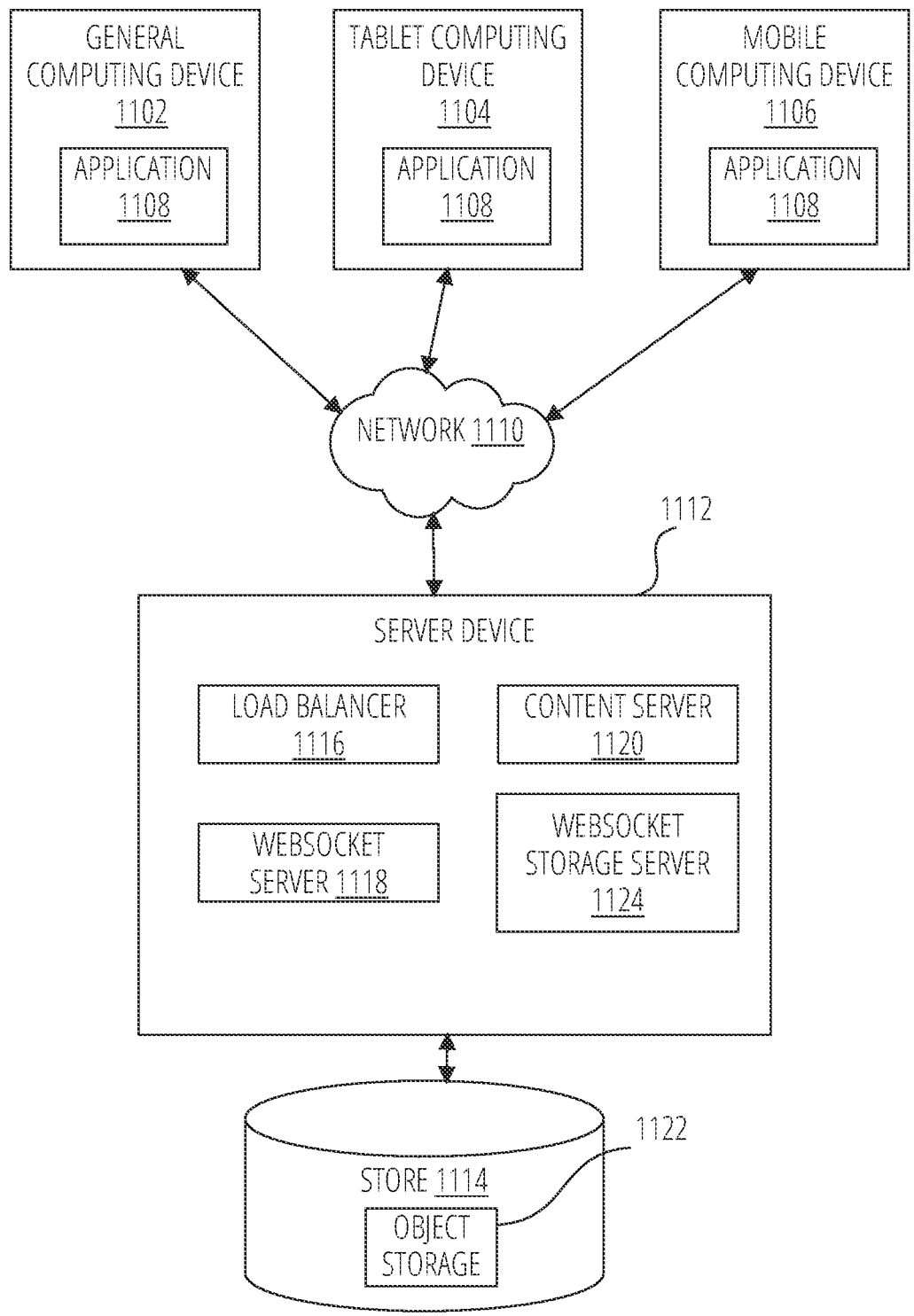
FIG. 11 depicts an architecture of a system for processing data received at a computing system in accordance with examples of the present disclosure.

FIG. 11 illustrates one aspect of the architecture of a system for processing data received at a computing system from a remote source, such as a general computing device 1102, a tablet computing device 1104, or mobile computing device 1106, as described above. In examples, the computing device 1102 may invite the tablet computing device 1104 and/or the mobile computing device 1106 to join in a session such that information, such as graphic information, can be shared among the devices. Content at a server device 1112 may be stored in different communication channels or other storage types.

One or more of the previously described program modules 924 or software applications 928 may be employed by the server device 1112 and/or the general computing device 1102, a tablet computing device 1104, or mobile computing device 1206 as described above. For example, the server device 1112 may include the load balancer 1116, the websocket server 1118, the content server 1120, and the websocket storage server 1124. In some examples, the server device 1112 may perform one or more functions of the content services platform 112. Each function provided by the server device 1112 may be virtualized in a unique service cluster, and each service cluster may perform a different function of the content services platform 112. Service clusters may be hosted on virtual machines in an example cloud network. An example cloud network may include a plurality of geographically diverse deployment sites (e.g., data centers) where various virtual machines are physically deployed. Although the server device 1112 depicts a plurality of components, the server device 1112 may include a single application or component. Accordingly, there may be multiple distributed server device 1112 that together perform at least some of the functions of the content services platform 112.

In examples, the load balancer 1116 may be the same as or similar to the load balancer 206. In some examples, the websocket server 1118 is the same as or similar to a websocket server of the websocket server cluster 208. Similarly, the content server 1120 is the same as or similar to a content server of the content service cluster 210. The websocket storage server 1124 may be the same as or similar to a server for the websocket storage 218. Any of these examples of the computing devices may obtain content or store content from/to the store 1114. In examples, the 1122 may store message information.

The server device 1112 may provide data to and from a client computing device such as a general computing device 1102, a tablet computing device 1104, and/or a mobile computing device 1106 (e.g., a smart phone) through a network 1110. By way of example, the computer system described above may be embodied in a general computing device 1102, a tablet computing device 1104, and/or an application 1108 (e.g., a smart phone). Any of these examples of the computing devices may obtain content from the store 1114, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which examples of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

The present disclosure relates to systems and methods for synchronizing message data between at least two clients according to at least the examples provided in the sections below:

(A1) In one aspect, some examples include a method for synchronizing message data between at least two clients. The method may include: receiving a request to initiate a shared session from a first client, the request including a first client identifier, based on the received request, providing a session identifier to the first client associated with the first client identifier, associating the first client identifier with the session identifier, receiving a request from a second client to be associated with the session identifier, associating the second client identifier with the session identifier, receiving message data from the first client, adding the message data to a queue associated with the session identifier, adding the message data together with the session identifier to a database and providing the message data from the queue to the second client based on the session identifier.

(A2) In some examples of A1, the method further includes: receiving, at a load balancer, the message data from the first client; determining, at the load balancer, an instance of a websocket server based on an availability of resources; sending the message data to the determined instance of the websocket server; and providing, from the websocket server, the message data to a websocket storage, the websocket storage including the queue.

(A3) In some examples of A1-A2, the method further includes: receiving, at the load balancer, the message data from the websocket storage; and providing the message data from a queue of the websocket storage to the second client.

(A4) In some examples of A1-A3, the method further includes: receiving, at a load balancer, the message data from the first client; determining, at the load balancer, an instance of a websocket server based on an availability of resources; sending the message data to the determined instance of the websocket server; and providing, from the websocket server, the message data to a content service cluster, the content service cluster storing the message data in the database.

(A5) In some examples of A1-A4, the message data includes object information and session identifier information, the object information being stored in a location of the database that is different than the session identifier.

(A6) In some examples of A1-A5, the object information comprises a graphical object displayed at a display associated with the first client for an augmented reality session.

(A7) In some examples of A1-A6, the message data and the session identifier are stored in an in-memory database.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method for synchronizing message data between at least two clients, the method comprising:
receiving a request to initiate a shared session from a first client, the request including a first client identifier;
based on the received request, providing a session identifier to the first client associated with the first client identifier;
associating the first client identifier with the session identifier;
receiving a request from a second client to be associated with the session identifier;
associating the second client identifier with the session identifier;
receiving message data from the first client;
adding the message data to a queue associated with the session identifier;
adding the message data together with the session identifier to a database;
providing the message data from the queue to the second client based on the session identifier;
receiving, at a load balancer, the message data from the first client;
determining, at the load balancer, an instance of a websocket server based on an availability of resources;
sending the message data to the determined instance of the websocket server; and providing, from the websocket server, the message data to a websocket storage, the websocket storage including the queue.

2. The method of claim 1, further comprising: receiving, at the load balancer, the message data from the websocket storage; and providing the message data from a queue of the websocket storage to the second client.

3. The method of claim 1, further comprising: receiving, at the load balancer, the message data from the first client; determining, at the load balancer, an instance of a websocket server based on an availability of resources; sending the message data to the determined instance of the websocket server; and providing, from the websocket server, the message data to a content service cluster, the content service cluster storing the message data in the database.

4. The method of claim 1, wherein the message data includes object information and session identifier information, the object information being stored in a location of the database that is different than the session identifier.

5. The method of claim 4, wherein the object information comprises a graphical object displayed at a display associated with the first client for an augmented reality session.

6. The method of claim 1, wherein the message data and the session identifier are stored in an in-memory database.

7. A content services platform comprising:
a processor; and
a memory storing instructions that, when executed by the processor, configure the content services platform to:
receive a request to initiate a shared session from a first client, the request including a first client identifier;
based on the received request, provide a session identifier to the first client associated with the first client identifier;
associate the first client identifier with the session identifier;
receive a request from a second client to be associated with the session identifier;
associate the second client identifier with the session identifier;
receive message data from the first client;
add the message data to a queue associated with the session identifier;
add the message data together with the session identifier to a database;
provide the message data from the queue to the second client based on the session identifier;
receive, at a load balancer, the message data from the first client;
determine, at the load balancer, an instance of a websocket server based on an availability of resources;
send the message data to the determined instance of the websocket server; and
provide, from the websocket server, the message data to a websocket storage, the websocket storage including the queue.

8. The content services platform of claim 7, wherein the instructions further configure the content services platform to: receive, at the load balancer, the message data from the websocket storage; and provide the message data from a queue of the websocket storage to the second client.

9. The content services platform of claim 7, wherein the instructions further configure the content services platform to: receive, at the load balancer, the message data from the first client; determine, at the load balancer, an instance of a websocket server based on an availability of resources; send the message data to the determined instance of the websocket server; and provide, from the websocket server, the message data to a content service cluster, the content service cluster storing the message data in the database.

10. The content services platform of claim 9, wherein the message data includes object information and session identifier information, the object information being stored in a location of the database that is different than the session identifier.

11. The content services platform of claim 10, wherein the object information comprises a graphical object displayed at a display associated with the first client for an augmented reality session.

12. The content services platform of claim 7, wherein the message data and the session identifier are stored in an in-memory database.

13. A non-transitory computer-readable storage medium, the computer-readable storage medium including instructions that when executed by a computer, cause the computer to:
receive a request to initiate a shared session from a first client, the request including a first client identifier;
based on the received request, provide a session identifier to the first client associated with the first client identifier;
associate the first client identifier with the session identifier;
receive a request from a second client to be associated with the session identifier;
associate the second client identifier with the session identifier;
receive message data from the first client;
add the message data to a queue associated with the session identifier;
provide the message data from the queue to the second client based on the session identifier;
receive, at a load balancer, the message data from the first client;
determine, at the load balancer, an instance of a websocket server based on an availability of resources;
send the message data to the determined instance of the websocket server; and
provide, from the websocket server, the message data to a websocket storage, the websocket storage including the queue.

14. The non-transitory computer-readable storage medium of claim 5, wherein the instructions further configure the computer to: receive, at the load balancer, the message data from the websocket storage; and provide the message data from a queue of the websocket storage to the second client.

15. The non-transitory computer-readable storage medium of claim 13, wherein the instructions further configure the computer to: receive, at the load balancer, the message data from the first client; determine, at the load balancer, an instance of a websocket server based on an availability of resources; send the message data to the determined instance of the websocket server; and provide, from the websocket server, the message data to a content service cluster, the content service cluster storing the message data in the database.

16. The non-transitory computer-readable storage medium of claim 15, wherein the message data includes object information and session identifier information, the object information being stored in a location of the database that is different than the session identifier.

17. The non-transitory computer-readable storage medium of claim 13, wherein the message data and the session identifier are stored in an in-memory database.

\* \* \* \* \*